United States Patent [19]

Tolan

[11] 4,312,479
[45] Jan. 26, 1982

[54] FUEL INJECTION NOZZLE WITH EDGE FILTER

[75] Inventor: Lewis E. Tolan, Simsbury, Conn.

[73] Assignee: Stanadyne, Inc., Hartford, Conn.

[21] Appl. No.: 122,008

[22] Filed: Feb. 19, 1980

[51] Int. Cl.³ .......................................... F02M 49/02
[52] U.S. Cl. ................................................... 239/86
[58] Field of Search ...................... 239/86, 453, 590.5, 239/575; 138/43; 210/488

[56] References Cited

U.S. PATENT DOCUMENTS

| | | | |
|---|---|---|---|
| 1,964,218 | 6/1934 | Schargorodsky | 239/86 |
| 2,067,131 | 1/1937 | Schlaupitz | 239/86 |
| 3,224,684 | 12/1965 | Roosa | 239/533.11 |
| 3,395,934 | 8/1968 | Rosan et al. | 285/92 X |
| 3,499,605 | 3/1970 | Dreisin | 239/86 |
| 3,829,014 | 8/1974 | Davis et al. | 239/533.11 X |

Primary Examiner—Robert B. Reeves
Assistant Examiner—Gene A. Church
Attorney, Agent, or Firm—Prutzman, Kalb, Chilton & Alix

[57] ABSTRACT

An edge filter for a fuel injection nozzle is provided with an improved connection to the stem of the nozzle. The connection comprises opposed cylindrical guide sectors on the filter having axial knurls that extend less than the full length of the guide sectors thereon. The knurls, which are case hardened, provide secure interference interengagement with the softer counterbore of the nozzle's fuel inlet stem. The guide sectors advantageously provide an edge filtering function as well as a guiding function.

7 Claims, 6 Drawing Figures

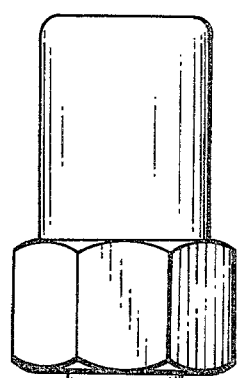
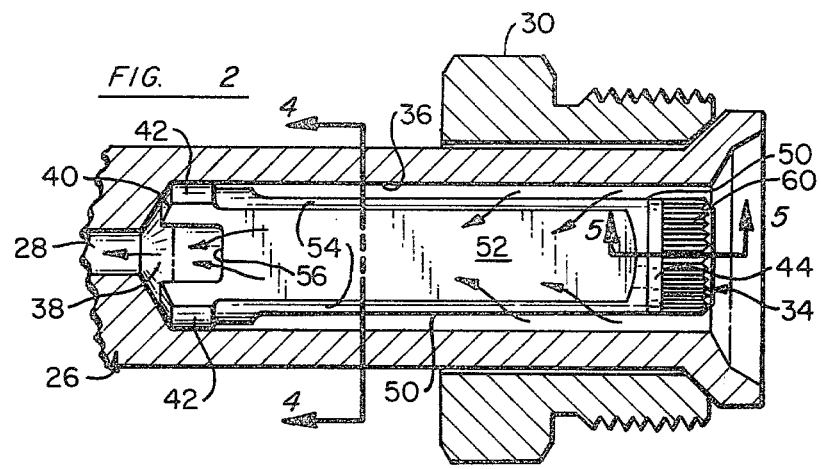
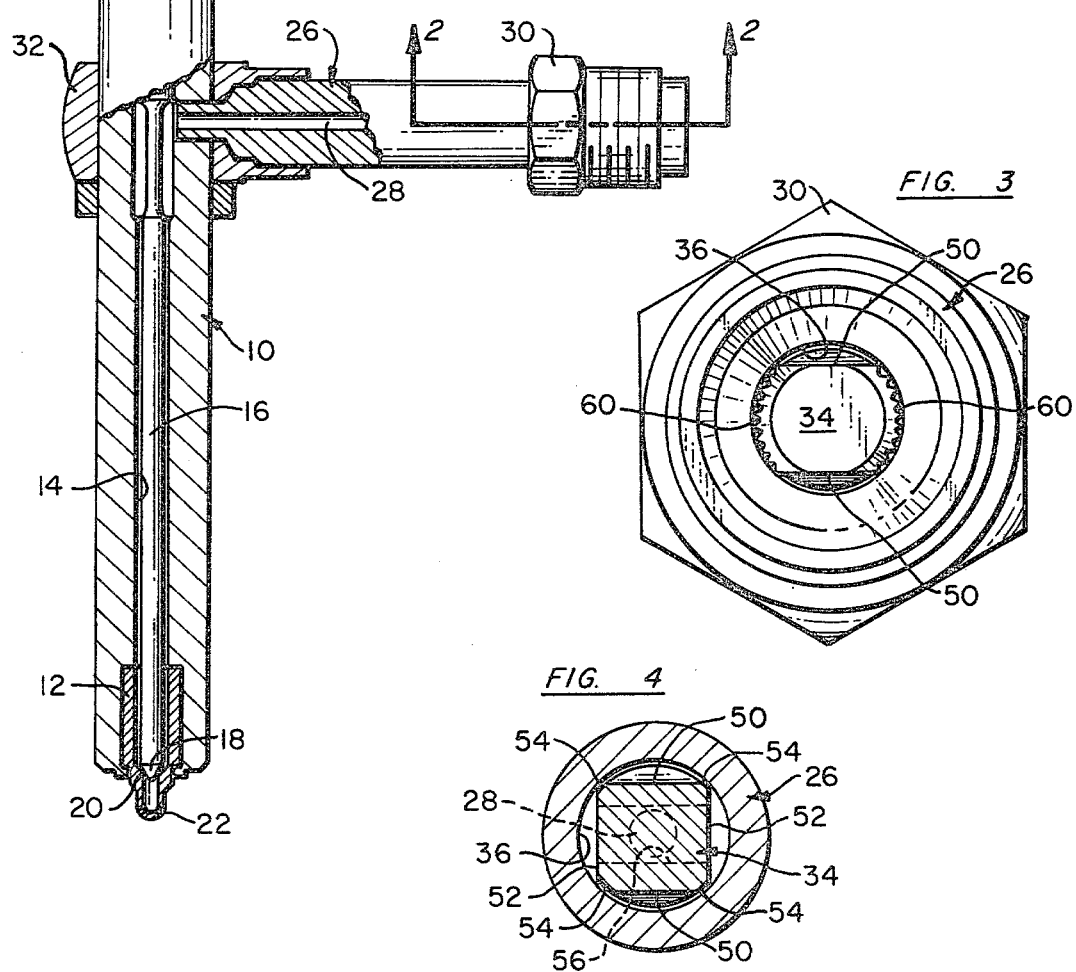

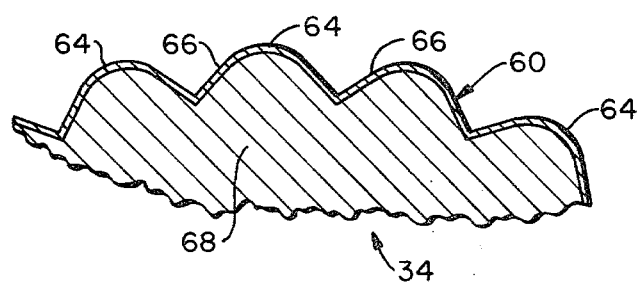
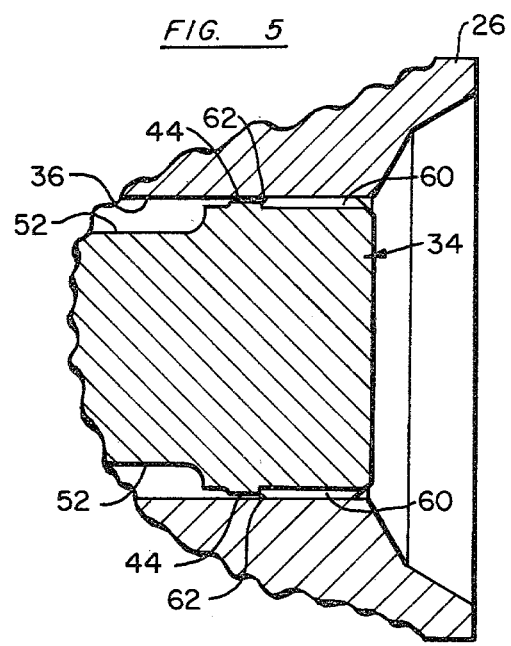

FUEL INJECTION NOZZLE WITH EDGE FILTER

TECHNICAL FIELD

The present invention relates to fuel injection nozzles and is more particularly concerned with a new and improved fuel injection nozzle incorporating an edge filter to prevent debris from entering the nozzle and plugging the discharge orifices thereof.

In the production of fuel injection systems, it has been found that certain debris or particulate matter is entrained within the fuel delivery system, either during the production of the system or due to particulate matter within the fuel itself. Most of the debris is soft so that an edge filter can readily break it up into particles of substantially smaller size than the discharge orifices thereby avoiding blockage or damage to the valve tip or valve seat of the nozzle. The edge filter is usually case hardened so that hard debris also is broken up during the rapid pulsating delivery of the fuel and will not render the filter less effective by gouging the edges thereof. Additionally, if the filter is not firmly secured within the nozzle to prevent hammering of its tapered surface against the nozzle inlet surface on which it bottoms, such hammering will cause excessive damage and premature malfunctioning.

BACKGROUND ART

One form of edge filter is described in the Davis et al U.S. Pat. No. 3,829,014 issued Aug. 13, 1974 and entitled "Fuel Injector Having Self-Cleaning Filter". In that design, a filter sleeve is inserted in the valve chamber adjacent the valve guide at a location between the fuel inlet and the valve tip.

Cylindrical edge filters also have been provided within the inlet stem of the fuel injector and have been retained therein by providing them with a longitudinal end slot. A roll pin forced into the slot cams the slotted end outwardly into firm engagement with the stem. This design not only requires multiple parts and is expensive to install but also permits damage to the edge filter by excess flexure of the slotted end which tends to crack the case hardened outer surface of the edge filter. In order to avoid the excess flexure problem, substantially closer tolerances are required on both the bore and the filter and these tolerances must be closely controlled.

DISCLOSURE OF INVENTION

In accordance with the present invention, there is provided a new and improved fuel injection nozzle provided with a cylindrical edge filter nested within its fuel inlet stem and retained therein in a substantially superior manner while obviating the deficiencies noted with respect to the slot and roll pin securing means used heretofor. Specifically, the new design provides a one-piece easily mounted unit that exhibits improved retention without the formation of debris or other mechanical problems. The improved connection avoids undesirable loosening of the edge filter and hammering thereof, all while effecting a cost reduction in the manufacture and installation of the unit. This is achieved while eliminating the need for excessively close tolerance control or the formation of harmful debris during the installation of the edge filter within the injection nozzle.

These and related advantages, which will be in part obvious and in part pointed out more in detail hereinafter, are achieved in accordance with the present invention by providing a edge filter with retention means that includes opposed cylindrical guide sectors having axial knurls thereon for secure interference interengagement with the inlet stem of the fuel injection nozzle at the upstream end of the edge filter. The guide sectors have a radius at least equal to the radius of the filtering edges with the knurl extending less than the full length of the guide sectors so that the guides provide alignment of the edge filter as it is being mounted and secured within the nozzle's fuel inlet stem.

BRIEF DESCRIPTION OF DRAWINGS

A better understanding of the invention will be obtained from the following detailed description and the accompanying drawings of an illustrative application of the invention. In the drawings FIG. 1 is a plan view, partially broken away and partially in section, of a fuel injection nozzle incorporating the features of the present invention.

FIG. 2 is an enlarged cross-sectional view taken along the line 2—2 of FIG. 1.

FIG. 3 is an end view from the right side of FIG. 2, showing the positioning of the edge filter within the connector end of the nozzle's fuel inlet stem.

FIG. 4 is a sectional view taken along the line 4-4 of FIG. 2.

FIG. 5 is a further enlarged fragmentary cross-sectional view of the interconnection between the edge filter and the fuel inlet stem at the knurl portion of the edge filter and FIG. 6 is a still further enlarged fragmentary cross-sectional illustration of the knurl provided on the edge filter.

BEST MODE OF INVENTION

Referring now to the drawings in greater detail wherein like reference numerals indicate like parts throughout the several figures, the present invention is shown as being incorporating within a fuel injection nozzle of the type described in greater detail in Roosa U.S. Pat. No. 3,224,684 issued Dec. 21, 1965 and entitled "Fuel Injection Nozzle". The exemplary injection nozzle shown in the drawing is of the pressure operable type and includes an elongated tubular body 10 having a discharge tip 12 rigidly positioned at one end thereof. The tubular body 10 provides a central longitudinal bore 14 extending throughout its length to form a valve chamber within which is located, a rod-like plunger or valve 16 having a conical tip 18 that cooperatively engages a valve seat 20 in the discharge tip 12 to control the discharge of fuel from the valve chamber through discharge orifices 22 within the discharge tip.

A fuel inlet stem 26, having a central axially extending fuel inlet bore 28, is fitted with a suitable connector 30 at its enlarged fuel inlet end and is connected at its fuel outlet end to the tubular body 10 of the nozzle by means of a fuel inlet fitting 32 so that the fuel inlet bore 28 communicates with the valve chamber 14 of the nozzle for delivery of discrete charges of high pressure fuel to the nozzle orifices 22 from an associated pressure charge pump (not shown).

In a typical nozzle of the type involved in this invention, the hydraulic pressure within the valve chamber required to open the valve is of the order of about 2,000 to 3,000 psi. Accordingly, it is imperative that the discharge orifices should not be blocked by solid particulate matter entrained in the fuel or by other debris such as may result from metal chips that remain in the fuel lines or in other parts of the fuel system after manufacture and/or repair. Such plugging, in addition to causing malfunctioning of the nozzle and damage to the valve seat, may impose excessive loads on the associated high pressure pump which delivers fuel to the nozzle in measured charges. Accordingly, it can readily be appreciated that means must be provided for guarding against blockage of the nozzle or damage to the valve tip or valve seat by such entrained debris or particulate matter in the fuel delivered to the valve chamber of the nozzle.

In accordance with the present invention this is provided by incorporating an edge filter 34 in the fuel inlet stem 26 of the nozzle. As best shown in FIG. 2, the stem 26 is provided with a counterbore 36 at its coupling or upstream end remote from the fuel inlet fitting 32. The generally cylindrical counterbore 36 extends only for a sufficient distance to accommodate the nesting therein of the edge filter 34 and terminates in a tapered bottom or inner surface 38 that is cooperatively engaged by the tapered front surfaces 40 on the innermost end of the edge filter 34 to form a seal preventing fuel from bypassing the filter.

The edge filter 34 is an elongated generally cylindrical member having raised shoulder portions or sectors 42 on the inner end thereof adjacent the tapered front surfaces 40 and complimentary guide shoulders or sectors 44 on the opposite or outer end thereof. The shoulders 42 and 44 are of the same radial dimension and have a diameter only slightly less than the diameter of the counterbore 36 within the inlet stem to permit smooth insertion of the edge filter therein. This is best shown in FIG. 5 with regard to guide shoulders 44. Two pairs of diametrically opposed flat chordal surfaces 50, 52 extend longitudinally from opposite ends of the filter and define the case hardened filtering edges 54 therebetween. Thus, as shown in FIGS. 2-4, a first pair of diametrically opposed chordal surfaces 50 extends from the outer or upstream end of the filter along at least about ¾ of the length thereof, terminating in spaced relationship to the raised shoulders 42 on the inner end thereof. Similarly a second pair of diametrically opposed chordal surfaces 52, oriented 90 degrees relative to the first pair, extend from the inner end of the filter along at least about ¾ of the length thereof toward, but stopping short of, the guide shoulders 44. The surfaces 50, 52 define therebetween four arcuate, longitudinally extending edge portions 54 that, in the preferred embodiment, have a diameter in the range of about 0.0035–0.0050 inch less than the diameter of the shoulders 42, 44 thereby providing a clearance between the inner surface of the counterbore 36 and the arcuate filtering edges 54 of approximately 5 thousandths of an inch in order to effect the desired filtering action. A central notch 56 is provided at the inner end of the edge filter extending between the diametrically opposed flat surfaces 52 so that, as best shown by the arrows of FIG. 2, the fuel flowing into the nozzle will travel through the coupling end of the inlet stem, along the first pair of flat surfaces 50, past the edge filters 54, along the second pair of flat surfaces 52 into the notch 56 and into the inlet bore 28.

As mentioned, it is important that the edge filter 34 be firmly secured within the counterbore 36 so that the tapered front surface 40 on the inner end of the filter bottoms against the tapered bottom surface 38 of the counterbore. If the edge filter is not firmly secured, but is loose, the pulsating charges of fuel will cause the edge filter to hammer or pound against the tapered surface 38, which action could result in chips or debris being formed on the downstream end of the filter thereby defeating the purpose of the filter.

In accordance with the present invention, substantially improved and superior retention means are provided on the edge filter in the form of knurls 60 at the outer or upstream end of the filter. In accordance with the preferred embodiment, the axially entending knurls 60 cover a major extent but less than the full axial length of the guide sectors 44, e.g. about 75% of the guide sector length. Additionally the knurls have a sloping or camming lead edge 62. In this way the sectors 44 provide a centering and guiding function for the knurls 60 as they enter the counterbore 36 and the lead edges 62 provide smooth displacement of the metal in the stem during the interference engagement therebetween. This tends to reduce the formation of fractures or chips in the case hardened filter during assembly.

As illustrated in FIG. 6, the top surfaces 64 of the individual knurls are not sharply pointed and, in fact, are smoothly contoured and unpointed, having been flattened or rounded by a de-burring operation such as by blasting and/or tumbling. This is important since the edge filter is entirely case hardened, as illustrated at 66 of FIG. 6, and any sharp points on the knurled surfaces might tend to fracture and produce debris as the filter is press fit within the fuel inlet stem. The top surfaces 64 therefore exhibits a radial projection that is about 50–75% of their potential for their straight knurl 90° tooth form. As mentioned, the entire edge filter is case hardened, the hardening extending to a depth of only about 5 to 8 mils and preferably about 6 mils, backed by malleable material, indicated by numeral 68.

The guide sector 44 adjacent the knurl also provides an edge filtering function. This is particularly important for any hardened material that is accidentally fractured or broken from the knurled surface. Also if the pulsating high pressure fuel delivery causes cavitation at the knurl, any debris passing through the knurl will flow directly toward the second pair of flat surfaces 52 thereby bypassing the edge filters 54. Thus the guide sectors 44 provide both a guiding function and an edge filtering function to facilitate both proper mounting of the edge filter within the stem and to catch chips or debris that might chip from the case hardened knurl or flow therethrough. As mentioned, the diameter of the sector 44 provides substantially less clearance than the edge filter surfaces 54 so that any debris that passes the sectors may readily pass through the nozzle orifices without causing damage. This is particularly important since the filter assembling operation is the most likely cause of hardened chip fractures, if they are to occur. Of course the incoming pressure blasts of fuel could be effective to loosen any fractured chips in the case hardened surface.

It is also significant to note the superior retention of the filter obtained by means of the knurled connection described herein. As is appreciated the case hardened knurl deformably displaces the metal in the stem as the force fit interference connection is made. This connection is relatively free of any debris and provides excellent retention of the filter. The retention force for filters having this construction averages about 140 pounds as compared to an average of only 64 pounds for the slot and roll pin construction when tested on a Tinius-Olsen test machine. Thus it can be seen that the present invention provides a fuel injection nozzle with an edge filter of superior retention, improved operating efficiency, ease of assembly and reduced cost.

I claim:

1. In a fuel injection nozzle for delivering pulsed charges of liquid fuel under high pressure to the cylinder of an associated engine and having a fuel inlet passageway for connection to a fuel supply line, the inlet passageway having a cylindrical edge filter mounting bore at the upstream end thereof, and a generally cylindrical one-piece metal edge filter nested in said cylindrical bore and having an even plurality of angularly spaced and axially extending filtering edges cooperating with said cylindrical bore to provide restricted circumferential filtering passages therebetween, the edge filter forming with the cylindrical bore a plurality of angularly spaced and axially extending alternating inlet and outlet channels intermediate the filtering edges and in communication with the inlet passageway respectively upstream and downstream of the edge filter, the improvement wherein the edge filter has a plurality of generally cylinder sector locating guides at the upstream ends of the outlet channels respectively, said sector locating guides having upstream knurled edge sections with an axial knurl thereon in interference fit engagement with said cylindrical bore for retention of the edge filter upon axial insertion of the edge filter therein, the sector locating guides having filtering edge sections downstream of the knurled edge sections respectively with a greater radius than said filtering edges for locating the edge filter and for edge filtering any interference fit debris from axial insertion of the edge filter into the cylindrical bore.

2. The fuel injection nozzle of claim 1 wherein said knurled edge sections are case hardened and deformably engage said cylindrical bore to provide a substantially debris-free connection therewith.

3. The fuel injection nozzle of claims 1 or 2 wherein each axial knurl has a smoothly contoured unpointed top surface engaging said counterbore.

4. Th fuel injection nozzle of claim 1 wherein said filtering edge sections have a greater radius than said filtering edges to provide both guiding and edge filtering of debris generated during assembly of the edge filter within the cylindrical bore.

5. The fuel injection nozzle of claim 1 wherein the filter has a plurality of chordal surfaces providing said alternating inlet and outlet channels respectively and forming said filtering edges therebetween, said cylinder sector locating guides being in axial alignment with the chordal surfaces providing said outlet channels.

6. The fuel injection nozzle of claim 1 wherein said knurled edge sections extend axially along a major extent of said cylinder sector locating guides.

7. The fuel injection nozzle of claim 1 wherein said edge filter is made of malleable material case hardened to a depth of about 5–8 mils.

* * * * *